United States Patent Office

3,538,701
Patented Nov. 10, 1970

---

3,538,701
BULKY YARN
Cyril G. Cannon, Usk, Alan Selwood, Llanyravon, Cwmbran, Barrie L. Davies, Langstone, and Roy A. Williams, Llansapley, England, assignors to British Nylon Spinners Limited, Pontypool, England
Continuation of application Ser. No. 461,435, June 4, 1965. This application Mar. 21, 1969, Ser. No. 809,435
Claims priority, application Great Britain, June 9, 1964, 23,760/64
Int. Cl. D02g *3/24*
U.S. Cl. 57—140                     2 Claims

---

ABSTRACT OF THE DISCLOSURE

A continuous filament yarn possessing a compact core region composed of longitudinally extending overlapping loops and a less compact peripheral region formed by stray loops which emerge from the core region.

---

This application is a continuation of application Ser. No. 461,435, filed June 4, 1965, now abandoned.

This invention relates to yarns containing one or more continuous filaments of an artificial polymeric material, and to a process and apparatus used for making such yarns.

Filaments of an artificial polymeric material are most conveniently manufactured in the form of continuous filaments by wet, dry or melt-spinning processes. These continuous filaments, as conventionally made, are essentially straight with a marked regularity. In yarns derived from such continuous filaments, these qualities facilitate the close packing of adjacent filaments so that the yarn is a relatively dense and compact structure. This compactness is reflected in several undesirable properties manifest by such continuous filament yarns, for instance, a poor covering power, poor heat insulation, a low degree of bulkiness and a somewhat cold handle, and these detract from the recognised excellent strength. In contrast with continuous filament yarns those derived from staple length fibres have a relatively low strength but a better developed covering power, heat insulation and bulkiness, and a softer handle, it being generally accepted that the properties are owed to the presence therein of irregular length fibres and numerous discontinuities.

During the past decade or so, much research effort, as evinced by numerous publications, including many patent specifications, has been directed to imparting some of the desirable qualities of a spun staple fibre yarn to a continuous filament yarn, and many methods and devices have been prepared for modifying a continuous filament yarn to achieve this end.

These modified continuous filament yarns are typically made by processes which involve treating a filamentary bundle to crimp, loop or otherwise disperse, individual filaments therein and they are not ordinarily prepared in an operation fully integrated with the extrusion and making of the constituent continuous filaments.

One reason which may be advanced to account for this concerns the high linear speed of the extruded filaments, which is of the order of 4,000 feet per minute in the case of polyamide or polyester filaments. This high speed makes it difficult to treat the travelling filaments in an appropriate manner. Another reason is connected with the nature of many freshly spun filaments which, because of their low molecular orientation are generally of poor strength and consequently are not suited for many textile purposes.

This invention has for one of its objects the provision of a novel continuous filament yarn which simulates in certain respects, notably in its bulk and covering power, a staple fibre yarn spun from comparable fibres and containing an appropriate equivalent number of fibres in its cross-section.

This invention has for another of its objects the provision of a process for making a novel continuous filament yarn by collecting freshly formed continuous filaments and assembling them directly into a yarn.

Another object of the invention is to provide suitable apparatus for practicing the above process.

Other objects of this invention will become apparent in the course of the following description and claims, and by reference to the accompanying drawings.

According to the present invention we provide a continuous filament yarn which comprises a relatively compact core and a less compact peripheral region, the core being formed of loops aligned in a generally axial direction and arranged so that there is a progressive advancement of loops along said core, said aligned loops containing twist, and the peripheral region being formed of a multiplicity of loops emerging from the core and extending outwardly therefrom.

The present invention further provides a process for making a yarn which comprises extruding a polymeric material into continuous filaments, subjecting one or more of the continuous filaments to the action of a fluid jet which applies tension to the filaments and forwards them to a rotating hollow body, gathering the filaments therein as an assembly of serially connected loops, continuously withdrawing loops from the hollow body and collecting the yarn in an orderly manner.

As loops are withdrawn from the hollow body in the form of a bundle of loops, the rotary movement of the body results in twist being inserted in the bundle of loops. Hence, the rotating hollow body serves to both form loops from the continuous filaments and to insert twist in the bundle of loops.

The present invention also provides an apparatus for making a yarn which comprises means for extruding polymeric material into continuous filaments from a source thereof, a fluid jet which is arranged to apply tension to the filaments and to forward them to a hollow body arranged to rotate and to serve as a loop and twist insertion device, and means for collating the yarn in an orderly manner following the withdrawal of loops from the hollow body.

DEFINITIONS

The term "loop" as used in this specification and in the claiming clauses hereof refers to the configurations which result from the folding of a continuous filament upon itself followed by a change in direction of the filament and the two limbs defining a single loop may or may not cross one another. The connecting portion of the limb which at some passages herein is referred to as the closed end, may be sharp and pointed as well as curved. The expression "serially connected loops" refers to the configurations which result when the folding of the continuous filament upon itself is repeated so that there are frequent changes of direction. In such structures a limb of one loop also serves as one limb of the next loop, and the loops have their closed ends at opposite ends of the common limb.

The term "continuous fiilament" as used herein and in the claiming clauses hereof refers to filaments which are of an indefinite length and which in the practice of the process of this invention are continuously supplied by extrusion from a source of the polymeric material. The term does not include short length fibres, commonly referred to as staple fibres.

In a preferred way of putting into practice this invention, continuous filaments are extruded through a spinneret from a source of a polymeric material, and one or more of the filaments are then passed through a jet to which fluid is supplied under pressure. The fluid flow within the jet should be arranged so as to accelerate the continuous filaments and to forward them toward and into the rotating hollow body. Filaments derived from certain polymeric materials, particularly filaments of synthetic organic materials such, for example, as polyamides, polyesters and polyhydrocarbons, but also filaments of, for example, cellulosic materials such as cellulose acetate, are macromolecularly oriented as well as accelerated by the jet, so that drawn filaments are forwarded to the rotating hollow body.

The fluid, which should not sensibly affect the material of the filaments, is preferably a gas, for example, air. The jet which will be referred to herein as an aspirator jet comprises in its basic form a filament inlet guide and a filament outlet passageway which are brought close together within a hollow body having an air inlet attached to it.

The hollow body which constitutes the loop and twist insertion device may have a variety of shapes, although because of the rotational speeds attained, it is desirable that it should not be too complex. We find that bodies which narrow between the mouth and the base so that they have an inclined surface around which the assembly of loops can collect and which contain an orifice in the base through which the loops may be withdrawn, are very suitable. Examples, include conically shaped bodies, two of which will be further described with reference to FIGS. 3, 4 and 5 of the accompanying drawings and a wineglass shaped body, one of which will be further described with reference to FIG. 6 of the accompanying drawings. In order to permit the escape from the hollow body of the fluid which forwards the filaments therein, it is often convenient to provide the body with perforations. The presence of the perforations in the body is conducive to the management of the assembly of loops within the hollow body. The hollow body may have a stem attached to assist in connecting it to the drive means. Metals, ceramics or plastics are suitable materials for the construction of the hollow body.

The loop and twist insertion device permits the collection of filaments, as a yarn, which are otherwise forwarded at a rate too fast to be accommodated by conventional winding-up apparatus.

The invention will be more readily understood by referring to the attached drawings, wherein:

FIG. 11 is a photograph of a model of the length of a yarn made in accordance with this invention as it was observed under an ordinary microscope;

Figure 1:
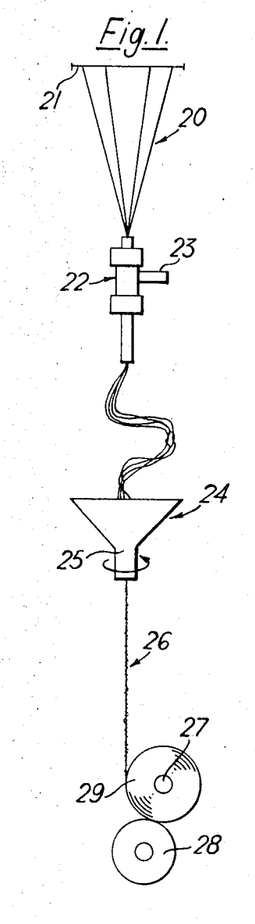
FIG. 1 shows a schematic representation of an apparatus assembly useful in practicing the invention.

Referring to FIG. 1, four freshly formed filaments, generally indicated by reference numeral 20, are spun through a spinneret 21 and then pulled through an aspirator jet 22 which is continuously supplied with air under pressure through air inlet 23. The filaments emerging from the aspirator jet are forwarded by the blast of air which issues from the jet to a hollow cone 24 which is rotating about its axis at a fixed speed. The linear speed at which the filaments are forwarded from the aspirator jet 22 to the cone 24 considerably exceeds the speed at which filaments are withdrawn from the cone. As a result of this overfeeding each of the continuous filaments within the cone doubles or folds upon itself to form a multiplicity of serially connected loops which collect as an assembly within the cone.

The filaments in the form of a bundle of loops are progressively withdrawn from the cone in the direction of its axis of rotation, through a stem portion 25 of the cone. The rotary movement of the cone 24 inserts twist in the bundle of loops being withdrawn along the axis of rotation. The yarn 26 so obtained is wound in the form of a cheese on a conventional wind-up arrangement using a traverse mechanism (not shown). As illustrated, the yarn is laid on a bobbin 27 surface driven by roller 28 to form a yarn package 29.

It will be appreciated that the speed of the yarn take-up bobbin will be maintained at a constant value during a given operation and it will be coordinated with the speed at which the filaments are forwarded to the rotating-body in accordance with requirements, for instance, twist level.

Figure 2:
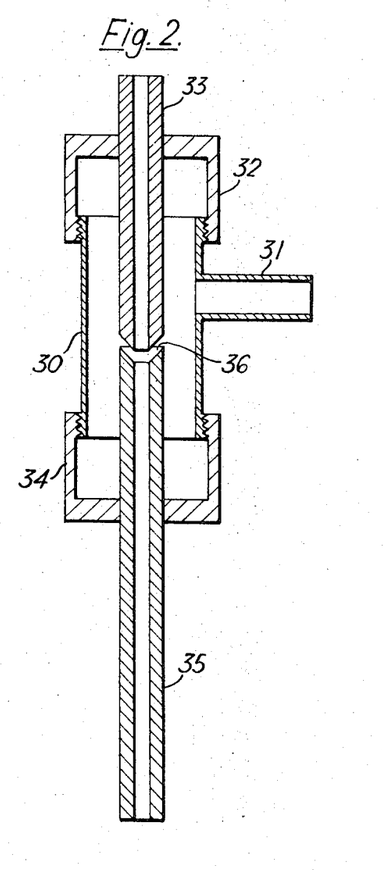
FIG. 2 shows in longitudinal sections an aspirating jet which may be used in combination with the apparatus of FIG. 1.
Figure 2:
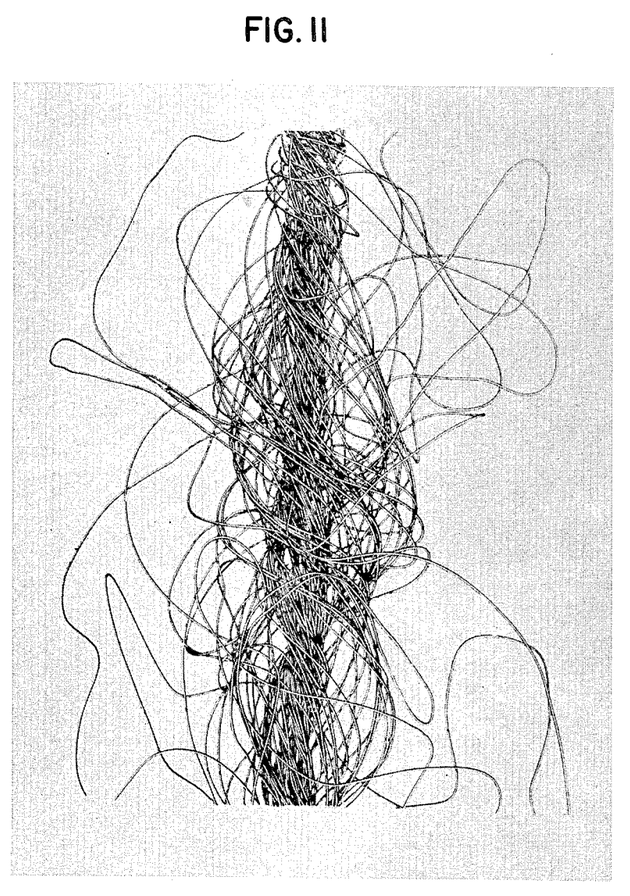
Figure 3:
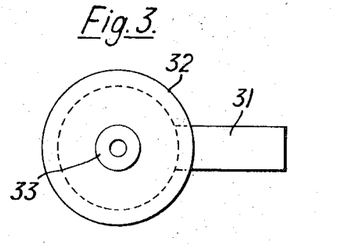
FIG. 3 shows a plan view of the aspirator jet of the previous figure.

FIGS. 2 and 3 shows in longitudinal section and plan view respectively an aspirator jet that can be used with the apparatus of FIG. 1. The aspirator jet comprises a hollow body portion 30 which is externally threaded at either end and has an air inlet pipe 31 attached thereto. A cover 32 containing a filament inlet guide 33 is screwed onto the top of the body portion 30. A second cover 34 containing a filament outlet passageway 35 is screwed onto the bottom of the body portion 30. The bottom and top ends of the inlet guide and outlet pasageway are chamfered to provide an annular air injection passageway 36. The angle of chamfer is referred to as the injection half angle and its valve is important in providing for forwarding the filaments by the air stream. The most generally useful aspirator jets for the purpose of this invention have injector half angle values in the range of between 2 and 25°. The aspirator jet is supplied with air under pressure through the air inlet pipe 31; the air stream enters the filament outlet passageway 35 through the air injection passageway 36, and, being directed annularly downwards results in a forwarding motion being imparted to the spinning filaments which pass down through the jet in the inlet pipe 31 and the outlet passageway 35.

In operation the filaments are passed from the spinneret and forwarded to the rotating cone by the action of the aspirating jet which provides an annular stream of air concurrent with the filaments. Under the impetus imposed by the air flow, tension is applied to the filaments which consequently are elongated, i.e. drawn out, in the distance between the spinneret face and the throat of the aspirator jet. The jet should be located beyond the point where the filaments have substantially completely solidified otherwise filament breaking with the production of discontinuous staple length fibres will occur.

In the particular case of melt-spun polymers, for example, synthetic organic polymers such as polyethylene terephthalate, polypropylene, polyhexamethylene adipamide and polycaproamide, the aspirator jet should be located beyond the region along the length of the extruded filament wherein the solidifying filament is in a highly viscous stage between the molten and the solid states. The optimum location for the aspirator jet is determined by altering its position until it elongates filaments well but does not disrupt the filaments or cause them to fuse together. In the case of melt spun polymers, the freshly formed filaments are macromolecularly oriented, as well as elongated by the tension applied to the filament as a result of the impetus imparted thereto by the air flow. Thus, polyhexamethylene adipamide filaments emerging from the aspirator jet were found to be reasonably oriented and the role of the aspirator jet in this connection was demonstrated by birefringence measurements carried out on lengths of the filament chopped therefrom immediately above and below the aspirator jet. The birefringence was 0.0438 above the aspirator jet and 0.0455 below.

The orientation of the filaments is reflected in the properties, for example, tenacity, of the yarns containing them, and it is achieved in an essentially simple manner simultaneously with the spinning and as a concomitant to the necessary forwarding of the filaments.

The velocity of the air stream required to elongate and orient melt spun filaments to the desired amount, which velocity is related to the air pressure and the design and other characteristics of the aspirating jet, will vary according to the polymer being spun and process conditions such as emergent viscosity of the polymer, i.e. the melt viscosity, at the time of extrusion, the rate of extrusion, the filament/air contact distance which provides the impetus on the filaments and the angle of incidence between the aspirating jet and the filaments. Although it is a variable parameter, the velocity must, when the filaments are derived from melt-spun polymer, be sufficiently high to apply to the filaments, a tension which will both elongate and macromolecularly orient the filaments to any desired extent.

Furthermore, with melt spun polymers the high velocity air with which the filaments are brought in contact within and below the aspirator jet, quenches the filaments in an essentially asymmetric manner which may induce the spontaneous or delayed development of an irregular crimp. This crimp may persist in the constituent filament or filaments of the yarn structure in which event they contain a crimp superimposed upon the array of filament loops. The presence of such as crimp may impart useful properties to the yarn structure.

The turbulence of the air within the aspirator jet may produce some interlacing and intermingling between filaments with the formation of a strand containing up to say 6 filaments. Such a strand can be overfed into the rotating cone in the same manner as separate continuous filaments and it is intended that the expression "continuous filament" as used herein and in the claiming clauses hereof should include such strands. However, as there are no advantages attendant upon the utilisation of such strands in the process, and, indeed, there are certain disadvantages, for instance the reduced bulkiness and covering power of yarns containing them, it is preferred that continuous filaments in a separated condition be employed. Electrostatic charging of filaments either prior to their entry, or during their passage through the aspirator jet, for instance, by rubbing contact with a metal bar or the throat of the jet, may be useful for minimising filament interlacing should yarn formation prove troublesome. A low value for the angle of incidence minimises turbulence within the air stream and consequently obviates or reduces the extent of filament interlacing.

The speed at which the filaments are forwarded by the aspirator jet can be varied over a wide range and is dependent primarily upon the air pressure, although variables such as polymer identity, filament denier, design and dimensions of the aspirating jet also influence the forwarding speed. Preferably, forwarding speeds above 3,000 feet per minute are employed and for melt-spun polymers such as polyamides, polyesters and polyhydrocarbons, speeds in the range of 7,000–20,000 feet per minute are the most usual. The design characteristics of the aspirator jet, the pressure of air supplied to it and the polymer extrusion rate, are the main factors determining the denier of the filaments which are forwarded to the rotating cone and from which the yarn structure is formed.

The design characteristics of aspirator jets at present available impose an upper limit on the filament denier of around 10. However, as the folding or doubling of the continuous filaments upon themselves when they enter the rotating cone is facilitated, and, indeed for some polymeric materials of high modulus, rendered practicable, by the use of low denier filaments, this process limitation does not detract from the essential utility of the process. Filaments of a denier of below, say ½ denier, cannot conveniently be made of indefinite length and do not have any great use in textiles. We have found that filaments with deniers in the range of between 1 and 6 are the most useful in this invention.

In the process of this invention it is only necessary for the filaments to be forwarded to the rotating cone by means of a fluid stream. The filaments need not be passed through an aspirator jet of the type just described, but can be forwarded by a fluid stream, however formed. Likewise air need not be used as the fluid medium; other gases such as steam, or liquids can be used.

As previously mentioned the continuous filaments are usually forwarded by the aspirator jet at linear speeds in the order of between 7,000–20,000 feet per minute. The filaments are urged forward by the air stream in a generally downward direction, but the turbulent flow and eddy currents within the stream which flows concurrently with the filaments whips the travelling filaments around and causes them to follow an irregular convoluted path. If the rotating cone is positioned too near the aspirator jet, the folding and doubling of the filaments to form an assembly of serially-connected loops may be unsatisfactory because of the air exhaustion from the jet. This problem can be minimised and a more satisfactory filament laydown achieved by providing a slight (usually not more than 8°) divergence at the end of the filament outlet passageway of the jet. When the receiver is too far from the jet controlled laydown may be difficult. The optimum distance has to be determined by simple experiments which involve altering the distance between the jet and the cone and observing the laydown of filaments into an assembly of loops. With respect to melt-spun polymers such, for example, as polyamides, polyesters and polyhydrocarbons, distances of between 6 inches and 3 feet from the outlet of the aspirator jet have been found to be perfectly satisfactory.

In operation, it is desirable from the standpoint of facilitating filament laydown and retention of the assembly within the cone, to position the cone so that its axis lies vertically below the outlet for the aspirator jet.

Figure 4:
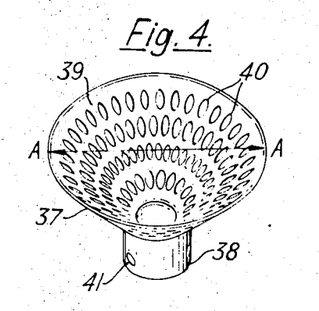
FIG. 4 shows a perspective representation of a conically shaped hollow body which may be used as the loop and twist insertion device in the apparatus of FIG. 1.
Figure 5:
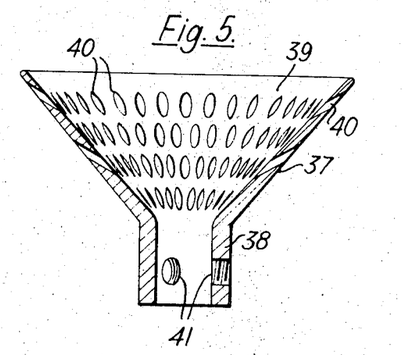
FIG. 5 shows in longitudinal section the conically shaped body of FIG. 4.

FIG. 4 shows in longitudinal section and FIG. 5 in a perspective view at the correct scale a hollow cone that may be used with the apparatus of FIG. 1.

The hollow cone is made of a light metal alloy (a high tensile strength "Alcan" aluminium alloy was useful for this purpose) and comprises a hollow conical body 37 and a stem 38 integral therewith. The conical body has a maximum diameter (A—A) of 3 inches and the angle substended at the apex is 90°. Hence, the interior wall 39 is inclined at an angle of slope of 45°. Holes 40 of $\frac{1}{16}$ inch diameter are bored into the wall of the conical body at a density of 30 per square inch, the holes passing obliquely through the wall in a direction substantially toward the apex of the cone. Approximately 30 percent of the area of the wall is foramenous. The stem 38 is ¾ inch long and ½ inch diameter and it contains a ring of holes (¼ inch diameter) 41. Because of the formamenous nature of its walls, the cone acts as a sieve and permits the escape of the air in which the filaments are entrained, which air would otherwise be deflected back towards the gun and spinneret. Consequently, filament laydown with the formation of a relatively stable assembly of filament loops is facilitated.

Furthermore, the direction of the holes 30 in the body of the cone reduces the possibility of filament "snatching" due to entry of the filament in the holes and so permits a withdrawal of the loops at a steady rate.

Figure 6:
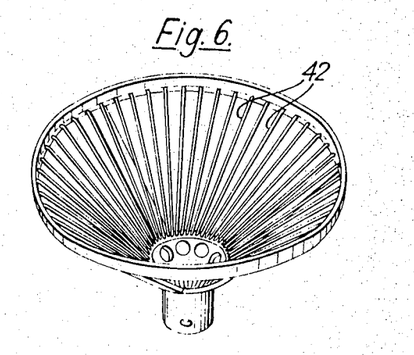
FIG. 6 shows a perspective representation of an alternative conically shaped hollow body, which may be used as the loop and twist insertion device in the apparatus of FIG. 1.

FIG. 6 is a perspective view of another cone which may be used in the apparatus of FIG. 1. The cone is made of a light metal alloy and its dimensions are the same as those for the cone shown in FIGS. 4 and 5. The wall of the cone between the rim and apex is formed of metal spokes 42 which constitute a metal grid. The grid spacing was approximately ¼ inch pitch at the rim converging to ⅛ inch near the apex. This cone while it proved satisfactory in use was less effective than the previous cone by reason of the reduced filament support and the possibility of filament loops protruding between adjacent spokes.

Figure 7:
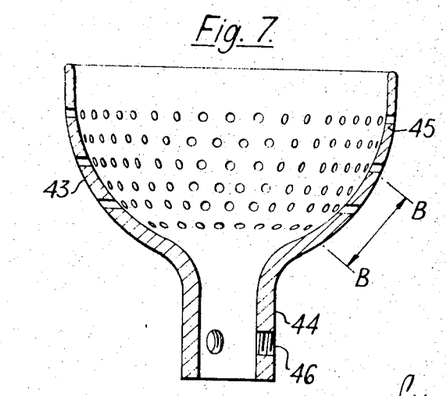
FIG. 7 shows in longitudinal section a different hollow body, in the shape of a wine-glass, which may be used as the loop and twist insertion device in the apparatus of FIG. 1.

Experiments have demonstrated that conical shapes generally are advantageous in producing yarn structures with good properties, possibly because they permit the arrangement of deposited filament loops in a layered assembly conforming to the wall of the cone; the withdrawal of such a layered assembly from the cone may be accomplished with a general retention of the layered structure and the loop form. However, other hollow bodies, particularly those with a shape approximating to that of a cone and providing an inclined surface for deposition of the filament loops, may be used. FIG. 7 shows in longitudinal section, a wine-glass shaped cone, which has proved very effective in the process of this invention. The wine-glass is made of a light metal alloy and comprises a concave body portion 43 and a stem 44. The wine-glass has a maximum diameter of 4 inches and the stem portion is ½ inch long and ½ inch diameter. Holes 45 of $\frac{1}{16}$ inch diameter are bored in the wall of the concave body portion and a ring 46 of 4 holes is bored in the steam. In use, the assembly of filament loops collected in the wine-glass was generally arranged in the form of a layered structure which lay along the inclined portion B—B of the concave body.

The cone or other hollow body into which the filaments are overfed has to be dimensioned in accordance with the number of filaments being fed into it. For use with up to about 10 filaments having deniers in the range of ½–8, cones with the dimensions of those described with reference to FIGS. 4, 6 and 7, are perfectly adequate. If more filaments than 10 are overfed into such cones, there is an increasing propensity for the loops to extend beyond the rim and hence escape from the confines of the cone. A stationary perforated cone surrounding the rotating cone and of larger dimensions may be provided to guide any such stray loops back into the rotating cone, and this offers a solution to this problem. However, it is more expedient to scale up the cone to provide for the greater number of filaments being forwarded to it.

The high speeds of rotation to which they are subjected make it essential to dynamically balance the cones (or other body) prior to use. The provision of a dynamically stable cone is assisted by the small dimensions thereof.

Figures 8, 10:
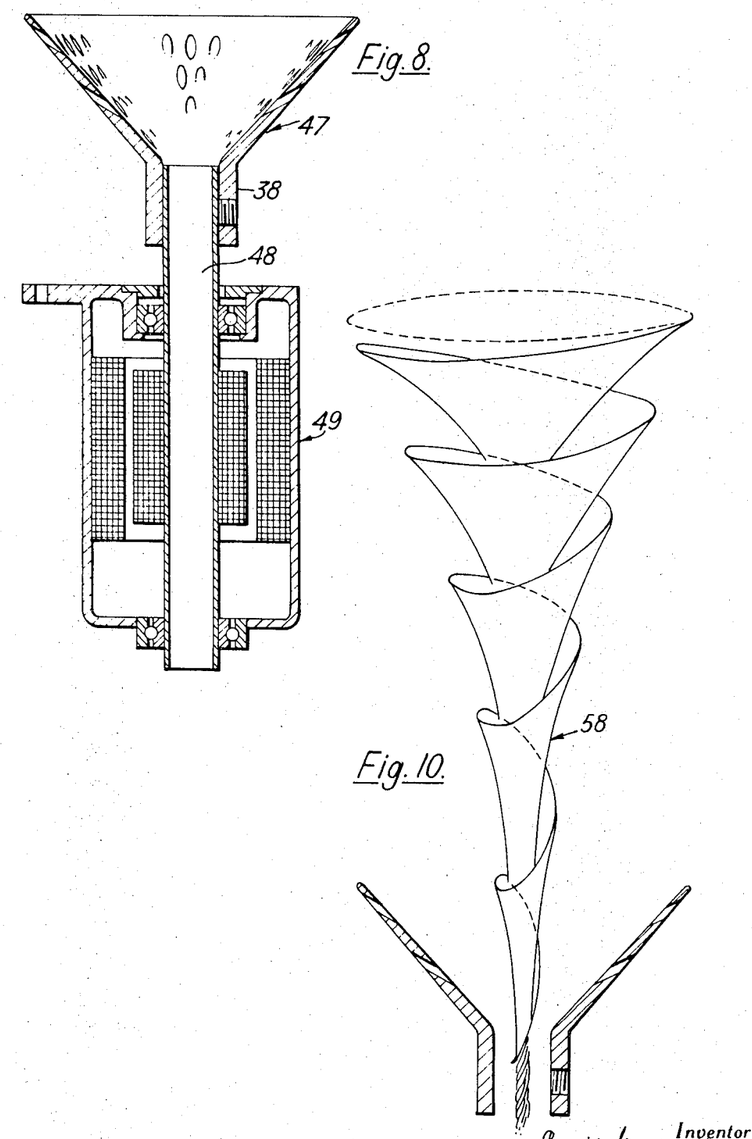
FIG. 8 shows in longitudinal section a conically shaped body connected to a suitable drive means.
FIGS. 9 and 10 are diagrammatic representations, intended to illustrate in a somewhat idealised manner, the events involved in the gathering of the forwarded filaments within a rotating cone as an assembly of serially connected loops, and the withdrawal of loops from the cone.

The cone (or other body) may be rotated in any convenient manner, for instance, by an electric motor. FIG. 8 shows a diagrammatic sectional view along the longitudinal axis of one arrangement for rotating the cone. The cone 47 is that shown in FIG. 4 and 5 and its stem 38 is attached to the hollow drive shaft 48 of a 3 phase induction motor, generally indicated by reference numeral 49.

Figure 9:
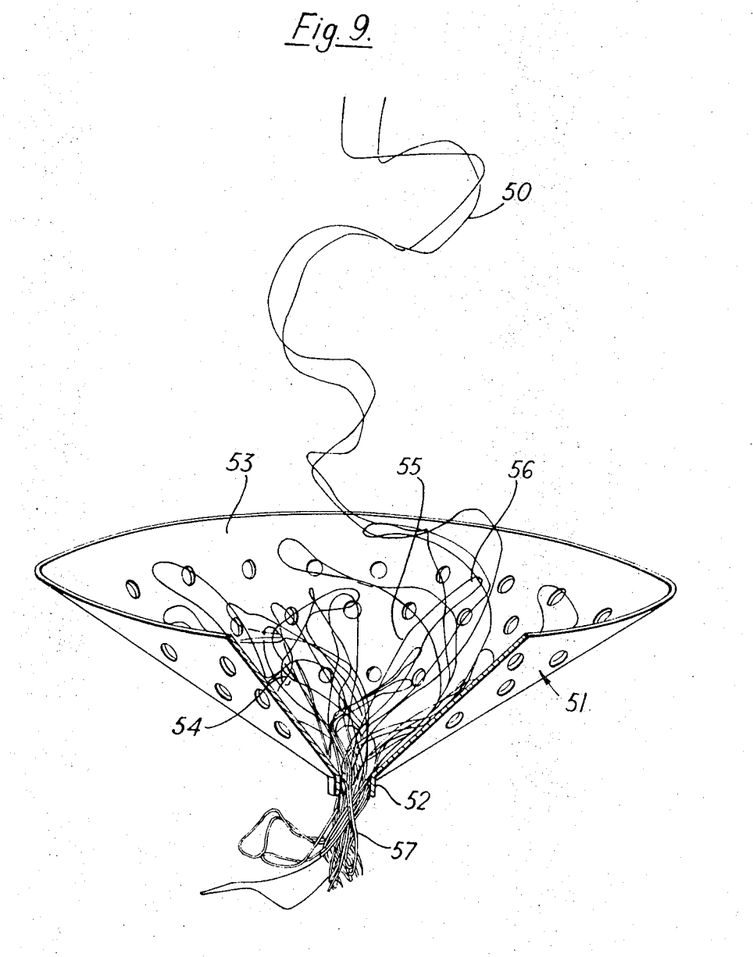

For the purpose of facilitating a more comprehensive knowledge of the manner in which the yarn in accordance with this invention is derived, there is now given the following explanation, which is intended to be read in conjunction with the diagrammatic illustrations of FIG. 9 and 10, of the phenomena which occur during the formation of the assembly of serially connected loops within a rotating cone and their withdrawal therefrom.

The speed at which these phenomena occur, the fineness of the filaments, and the number of loops involved, make it impossible to observe and to depict these phenomena with complete accuracy and it should be understood that the explanation now given, which is founded on observation, experiments with model system, and photographic techniques, while it is beleived to be in general accordance with actual practice, represents a somewhat idealised picture of what are a very complex and rapid series of events.

When the forwarded filaments enter the rotating cone, the leading end of each impinges upon the internal surface thereof and they are restrained, at least briefly, by frictional forces, and the downward movement of the filaments is arrested. As the linear speed of the filaments at the point of impigement is less than the linear speed of the filaments as they enter the cone, the downwardly travelling filaments are folded or doubled upon themselves so forming therein an assembly comprising a multiplicity of serially connected loops, folds or doublings. The loops have a variable loop length defined as the mean length of the two limbs of the loop. Some of the factors which determine the loop length are the modulus of the filaments, their denier, the speed at which they are forwarded to the cone by the aspirator jet and the configuration and dimensions of the cone.

The arrangement and relative disposition of the serially connected loops within the cone is influenced considerably, and to great advantage, as will subsequently be explained in some detail, by the convoluted path followed by the filaments in their passage to the cone and the associated oscillatory motion imparted to the filaments by the action of the aspiratory jet which causes them to follow an irregular convoluted path. On account of this movement the filaments traverse the area above the cone and consequently the point of deposition of the filaments within the cone is constantly altering so that the filaments loops or doublings spread over a considerable part of the cone in the form of a randomly laid web comprising filament loops or doublings with numerous filament cross-over points. The deposition of the serially connected loops in this manner imparts a degree of coherency and stability to the randomly laid web which is reflected in the ease with which the loops can be withdrawn from the cone.

The centrifugal forces arising from the rotary movement of the cone fling the freshly formed loops against and along the inclined surface of the cone and assist in aligning the loops in radial directions relative to the axis of the cone. As they are thrown outwards and along the cone, entanglement of loops can occur to a variable extent. The general arrangement of loops in the assembly within the cone is illustrated diagrammatically in FIG. 9. Referring to that figure, two downwardly travelling filaments 50 are overfed into a rotating hollow cone 51 provided with a short stem 52 and having a foraminous inclined wall 53. The filaments double upon themselves to form an assembly of serially connected loops 54 wherein the majority of the filaments are aligned in radial directions up the inclined wall 53 against which they are held by centrifugal and frictional forces and by the pressure of air moving out through the perforations in the wall. One radially extending loop is identified by reference numeral 55 with its bight 56 toward and just below the rim of the cone. This loop 55 extends down into the bundle of loops 57 being withdrawn through the stem. At some point (not shown) each of the limbs of the loop 55 will reverse in direction to form two other loops, the bights of which are at opposite ends of the limbs to bight 56.

If the looping and doubling of the continuous filaments was permitted to continue without any removal of material from the cone, a mass of haphazardly looped and doubled filaments would be built up within the cone and within a short space of time, of the order of a few seconds with the cone shown in FIG. 9, the cone would be completely filled thereby. However, this is not allowed to happen because there is a progressive withdrawal of loops from the cone through the stem thereof, and in a direction along the axis of rotation, in the same direction as that of the entering filaments. Withdrawal of the loops is initiated by pulling down the web, and may be achieved by the insertion of a wire, around which loops condense, removing the wire thereby dragging a bundle of loops away from the cone, separating the wire from the loops and leading the bundle of loops to the constant speed wind-up device. Once the withdrawal of loops is commenced, and provided a constant wind-up speed is maintained, an equilibrium state is attained between the accumulation of filament loops within the cone and their removal as a bundle of loops.

The rotary movement of the cone, once the withdrawal of loops has been commenced, causes loops within the cone to move around and down the inclined surface thereof in a path which is believed approximate to a continuous conical spiral. Because of the frictional interaction between and amoung the loops, a tractive effect is exerted by a given loop on successive loops and consequently the entire assembly moves as an integrated structure.

FIG. 10 shows in diagrammatic and idealised form, the volute 58, exploded along its axis, described within the cone as loops move down the inclined surface and out through the stem. In the downward movement the assembly of interacting serially connected loops is closely held against the wall of the cone by the summation of centrifugal and frictional forces and by the air which moves therethrough in its passage to the perforations. The increased pitch of successive whorls in the volute is a reflection of the funneling effect to which it is subjected as it moves toward the apex of the cone. The funneling effect when superimposed on the rotational movement enhances the alignment of loops in radial directions within the cone.

The number of loops present in the assembly and the speeds involved, makes it impossible to determine with certainty the exact course taken by the loops as they move down and out of the cone but it is certainly not so clearly defined as that shown in FIG. 10, possibly because of the entanglement which frequently occurs between adjacent loops, although we have found it to be a useful working model.

High speed photographs verify that the web moves down and out of the cone as an integrated structure, this being attributed to the good coherency and stability between the loops therein. They also indicate that there is an overall retention of the loop character with a general alignment of the loops in radial directions along the cone surface and that the loops move out of the cone in a progressive and orderly manner and with the majority of the loops aligned parallel to one another. It is the retention of the loop form during the withdrawal of the web from the rotating cone that makes possible the process of this invention. Furthermore, the removal of the loops in a progressive manner in the order in which they were laid and with the loops aligned in the same general direction confers upon the resultant yarn some of its characteristic features.

As the bundle of loops, indicated by reference numeral 57 in FIG. 9, moves out through the stem of the cone, twist is inserted therein, and this twist which can be seen in the bundle, condenses the bundle of loops into a relatively compact mass which forms the core of the yarn. The twist insertion is attributed to the fact that at some stage in their withdrawal from the cone the loops are located because of their alignment, partly in the cone and partly in the bundle which has moved out therefrom under the influence of the pulling force exerted by the wind-up device.

For instance, in FIG. 9, the loop 55 has its open end embedded in the bundle and its bight within the cone. With one end restrained in the bundle of loops which is itself held by the wind-up device, the other end is rotated by the rotary movement of the cone, and consequently twist is inserted in the bundle. The twist inserted runs down the bundle of loops until it encounters a twist barrier.

In the withdrawal of the web from the cone, the terminal portions of many of those loops, such as the one indicated by reference numeral 56, which are aligned in radial directions along the wall of the cone, are not carried into the main bundle when they slip off the cone wall and hence they are twisted not at all or to a lesser degree than the part located in the bundle. If we consider loop 55, its limbs somewhere in the bundle 57, because the loops are serially connected, reverse in direction and form two other loops which share a common limb with loop 55 and which are aligned therein, so as to extend in the general direction of the axis of withdrawal, with twist superimposed thereon. Hence, for each loop with a closed end in the cone, there will be two loops with their closed ends within the bundle of loops. As a variable length part of loops such as 55, are not carried into the bundle during withdrawal, they project out of the twisted and hence compacted bundle which constitutes the core, as pedicled loops. It is these pedicled loops which constitute the peripheral region of the yarn.

FIG. 11 as previously indicated is a photograph of a model which reproduces the structure of a short length of yarn made in accordance with this invention as it was observed under a microscope.

The yarn consists of a relatively dense and compact core 59 and an open and less compact peripheral region 60.

The core comprises a cancatentation of loops aligned in the general direction of the longitudinal axis but with the loops twisted together in more or less regular helices with a helical angle of around 70°.

Cross-sections taken at random along the length of the yarn show an approximately constant number of filaments in the core. The number of filaments found is related to the linear speed E at which the filaments enter the core, their number N and the linear speed W at which the loops are withdrawn from the core. The number can be found by multiplying the ratio $E/W$ by N. The cross-sections frequently show in addition to the parallel filaments which represent the limbs of loops, the curved end of a loop.

The loops within the core are arranged in a superimposed parallel array but because of the progressive and orderly manner in which loops are withdrawn from the rotating cone with the overall retention of the loop form and their alignment, the bights of loops, which bight may in the compact core be more peaked than curved, are arranged in a generally echelon formation along the length of the core.

It should be appreciated that the actual arrangement of the loops within the core is more complex than the above description thereof which is based on a somewhat idealised structure, and, in particular, there is considerable entanglement between loops which may sometimes pass through one another, and repeated reversals of direction over a short length, often distort the essentially staggered relationship between loops, although overall it is retained. The overall pattern is that of a superimposed array of loops, aligned in a direction essentially parallel to the long axis of the core, although helically twisted in that direction, with successive loops staggered from one another.

The peripheral region 60 comprises a multiplicity of closed end loops 61 which emerge from the relatively compact core 59 wherein their limbs constitute the limbs of the structural loops of the core and which extend outwardly therefrom in a more or less random array.

In the yarn represented by FIG. 11, it is evident that a number of the pedicled loops 61 are arranged for at least part of their length as a loose wrapping around the core 59. Some of the loops which are loosely wrapped in this manner are indicated by reference numeral 62. The helical wrapping of loops in this manner is believed to be due to some of the long radially extending loops doubling back upon themselves to contact the bundle of loops so that they are twisted, but to a lesser extent, along with the main bundle of loops. Other loops 61 project outwardly from the core 59 in radial directions and the overall picture is one of a random array of loops forming a network around a compact core.

A characteristic feature of the yarn represented in FIG. 11, as with all the yarns of this invention, is its bulkiness, i.e. relative volume occupied by a given weight and the irregular nature of its surface as a result of the presence of a peripheral shell containing a more or less random array of loops.

The bulkiness is a reflection not only of the readily visible loops arranged in a random array at the surface of the yarn, but also the structure of the cone wherein loops are in a superimposed but staggered relationship with some integrated entanglement between them. Because of their bulky nature, the yarns have an excellent covering power and fabrics made from them have warmth. The irregular surface of the yarn gives them a handle or feel similar to that of spun yarn made of comparable staple length fibres.

In the yarn represented by FIG. 11, the core constitutes about 25 percent of the diameter thereof. However, in other yarns in accordance with this invention the core may constitute more or less than this amount of the diameter. Generally, the core comprises between 10 and 85 percent of the diameter of the yarn. Furthermore, instead of the essentially random array shown in FIG. 11, a considerable number of the loops may be loosely wrapped for a few helical turns around the core.

As the twist inserted in the bundle of loops is a function of the rotary movement of the cone relative to the linear speed at which the bundle is moved away by the wind-up device it is determined by the operating conditions at which the apparatus is employed. Thus, for example, if the filaments are forwarded to the cone at a speed of 10,000 feet per minute, and the filament loops are then caused to rotate at 15,000 r.p.m. through rotation of the cone at this speed, before being pulled from the cone and wound-up at a speed of 250 feet per minute, the twist insertion rate is $$\frac{15,000}{250 \times 12}$$

t.p.i. or 5 turns per inch.

Hence the amount of twist which is inserted, and which imparts to the yarn a necessary coherency and stability, can be controlled in a simple and effective manner. The optimum twist for best properties in the yarn is dependent upon the denier thereof and the relationship between these two parameters is concisely expressed by means of the twist factor. This is defined (see, for instance, Textiles Terms and Definitions, 4th edition, published by the Textile Institute) as the actual twist divided by the square root of the cotton count which is related to the denier.

The most satisfactory yarns of this invention generally have a twist factor in the range between 3/4 and 6 and most usually between 1 and 4.

At very low twist levels the yarn may be drafted down to lower deniers by conventional means.

The apparatus described with reference to FIG. 1 is, from a technical standpoint, a false twist apparatus, since neither the spinneret nor the package on which the yarn is wound up rotate about the yarn axis, yet the yarn which is wound must be considered as possessing real twist. Certainly, it is impossible to remove the twist from the yarn which is a stable product and which can be wound up in a conventional package and stored indefinitely. The insertion of real twist on a false twist type machine is explained by the fact that, the actual twist has two components, namely, twist in the filaments which enter the rotating hollow body and twist of the opposite kind in the filament loops emerging therefrom. The twist in the entering filaments is low since they are moving so rapidly and in any event this twist is inserted in very fine filaments, while the twist in the emerging bundle of filament loops, which moves at a slower rate, is much higher.

The invention will now be illustrated by the following specific examples which are not to be construed as limiting the scope thereof.

In these examples, the bulk factor was determined in the following manner.

Five turns of the yarn were wound under a tension of 0.01 gm. per denier around a flat plate 1 mm. thick and 10 cms. long, with the loops of the winding spaced apart a distance of 2½ mm. The plate was supported on the stage (¾ inch diameter) of a thickness gauge with the loops of the yarn lying symmetrically across the stage. The top plate ¾" diameter of the gauge was then lowered onto the yarn under a load of 10 gms. and the gauge reading taken at a steady value. The loading was then increased to 50 gms. and the gauge was again read when steady. The percentage difference between the first and second readings was directly related to the void volume within the yarn and hence it was an expression of the yarn bulk.

EXAMPLE 1

Polyhexamethylene adipamide having a relative viscosity of 35 was extruded through 0.009 inch diameter orifices in a spinneret at a rate of 0.05 lb. per hour per orifice at a spinning temperature measured at the spinneret of 273° C. into ambient air at 20° C., and 55 percent relative humidity.

Four of the polyhexamethylene adipamide filaments were passed through the aspirator jet of FIG. 2 which was centered 18 inches below the spinneret face. The important dimensions of the aspirator jet were as follows:

Filament inlet guide: internal diameter, ⅛ inch length, 2 inches
Filament outlet passageway: internal diameter, 3/16 inch length, 6 inches
Injector half angle ($\alpha$): 10°
Air consumption: 15 cubic feet per minute The air was supplied to the aspirator jet at ambient temperature. The velocity of the air, measured in terms of the air consumption, was fixed at the required level by adjusting the size of the filament inlet and outlet passageways, i.e. the distance between the two.

From the aspirator jet the filaments were forwarded at a linear speed of around 15,000 feet per minute into the cone shown in FIGS. 4 and 5, which was positioned 8 inches below the exit from the aspirator jet and rotated by a 3 phase electric motor connected to its stem at a speed of 18,000 r.p.m. The cone, which was made of an "Alcan" (registered trademark) aluminium alloy, had the following dimensions:

Maximum diameter: 3 inches
Height: 2 inches
Length of stem: ¾ inch
Diameter of stem: ½ inch
Percent opacity to air: 80.4%

The cone collected the filaments in the form of a randomly laid web, which comprised a large number of variously sized loops, many of which were aligned with their limbs extending upwardly along and against the internal wall of the cone. The bottom of the web was continuously pulled through the stem in the apex of the cone and the bundle of loops moved away from the cone at a rate of 160 feet per minute.

The yarn so obtained had the following properties:

Denier: 290
Twist level: 9.4 t.p.i.
Twist factor: 2.18
Extensibility: 35 percent
Core region (percent of total diameter): 10 percent.

Individual filaments in the yarn possessed a denier of 1.5 and a birefringence of 0.045. The yarn had the hand or feel of a polyhexamethylene adipamide yarn spun from stable fibres. It was subsequently woven into a cloth which had a warm and soft hand.

EXAMPLE 2

Polyhexamethylene adipamide having an inherent viscosity of 0.882 (measured in 90 percent phenol/water at 25° C. and a concentration of 0.5 percent) was extruded through 0.009 inch diameter orifices in a spinneret at a rate of 0.05 lb. per hour per orifice at a spinning temperature measured at the spinneret of 273° C. into ambient air at 20° C.

Three of the polyhexamethylene adipamide filaments were passed to the aspirator jet used in Example 1. The pertinent dimensions and distances were the same as in that example.

From the aspirator jet the filaments were forwarded at a linear speed of 18,600 feet per minute into the wineglass shaped body of FIG. 6, which was positioned 8 inches below the exit from the aspirator jet and rotated by a 3 phase electric motor at a speed of 18,000 r.p.m. The "wine-glass" which was made of an "Alcan" (registered trademark) aluminium alloy, had the following dimensions:

Maximum diameter: 4 inches
Height: 2½ inches
Length of stem: ½ inch
Diameter of stem: ½ inch
Percent opacity to air: 90.2%

The "wine-glass" collected the filaments in the form of a randomly laid web, comprising a large number of variously sized loops, many of which were aligned with their limbs extending upwardly against the internal surface of the body. The presence of the perforations in the wall of the "wine-glass" permitted the ready escape of the air and there was little disturbance of the filament loops during, and subsequent to deposition, from the air.

The bottom of the web was continuously pulled down and out of the rotating body through its stem and the yarn so obtained wound up in the form of a cheese at a rate of 150 feet per minute.

The yarn had the following properties:

Denier: 268
Tenacity (gms. per denier): 1.05
Extensibility (percent): 61
Bulk factor (percent): 6.2
Core Region (percent of total diameter): 12

Individual filaments in the yarn had a mean denier of 1.3 and a birefringence of 0.039.

The yarn which had the appearance of a soft cotton yarn possessed a good covering power, could be readily dyed and fabrics made therefrom had a soft and warm handle with a good abrasion resistance and did not yellow when heat treated.

EXAMPLE 3

The procedure of Example 2 was repeated except that six filaments of the polyhexamethylene adipamide were used instead of three.

The yarn obtained had a denier of 580 and a bulk factor of 7.3 percent which was several times greater than the bulk factor of a comparable polyhexamethylene adipamide spun staple yarn.

Figure 12:
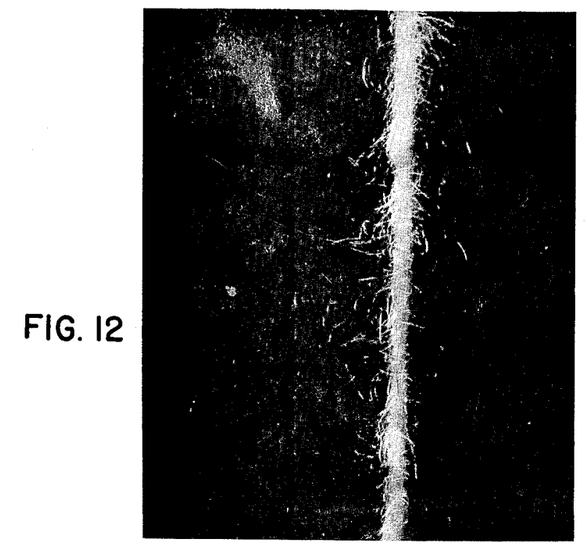
FIGS. 12–16 are photomicrographs at a magnification of 10×, of the yarns made in accordance with examples herein.

A photomicrograph of a length of the yarn is shown in FIG. 12. The core region constituted 5 percent of the total diameter.

EXAMPLES 4–7

Employing the apparatus assembly of Example 1, yarns were prepared from the various melt-spinnable polymers reported in Table 1 which also includes the relevant process conditions and some of the properties of the yarns.

All the polymers contained 0.3 percent titanium dioxide as a delustrant, except the polydodecanethylene terephthalamide of Example 7 which contained none.

The inherent viscosities of the polymers were measured in the same manner as the polyhexamethylene adipamide of Example 2, except for the polydodecanethylene terephthalamide of Example 7, the inherent viscosity of which was measured in dichloroacetic acid, at 25° C. and a concentration of 0.5 percent.

TABLE 1

| | | Spinning conditions | | | | | Air consumption in jet, cubic ft./min. | Rotational speed of loop and twist insertion device, (r.p.m.) |
|---|---|---|---|---|---|---|---|---|
| Example No.—Polymer | I.V. | Spinning temp., (percent) | Rate lbs./hr. orifice | Filament shape | No. of filaments | | | |
| 4—Polyhexamethylene adipamide | 0.982 | 290 | 0.05 | Trilobal | 3 | | 15 | 18,000 |
| 5—Polyepsilon caprolactam | 0.810 | 270 | 0.06 | Circular | 4 | | 15 | 18,000 |
| 6—Polyhexamethylene suberamide | 0.851 | 280 | 0.06 | ...do | 4 | | 15 | 18,000 |
| 7—Polydodecanethylene terephthalamide | 0.984 | 300/330 | 0.06 | ...do | | | 15 | 18,000 |

| | | Yarn properties | | | | | Filament properties | |
|---|---|---|---|---|---|---|---|---|
| Example No., Polymer | Wind-up speed, (ft./min.) | Denier | Ten., g./den. | Ext. to break, percent | Bulk factor, percent | Core region, percent | Denier | Birefringence |
| 4—Polyhexamethylene adipamide | 150 | 279 | 0.83 | 54.5 | 6.5 | 5 | 1.3 | 0.035 |
| 5—Polyepsilon caprolactam | 150 | 332 | 1.18 | 39.9 | 5.9 | 5 | 0.8 | 9.033 |
| 6—Polyhexamethylene suberamide | 150 | 298 | 1.09 | 91.8 | 8.3 | 10 | 1.9 | 0.041 |
| 7—Polydodecanethylene terephthalamide | 120 | 923 | 0.57 | 54.0 | 12.0 | 10 | 3.4 | 0.040 |

NOTES ON TABLE 1

Example 4

Figure 13:
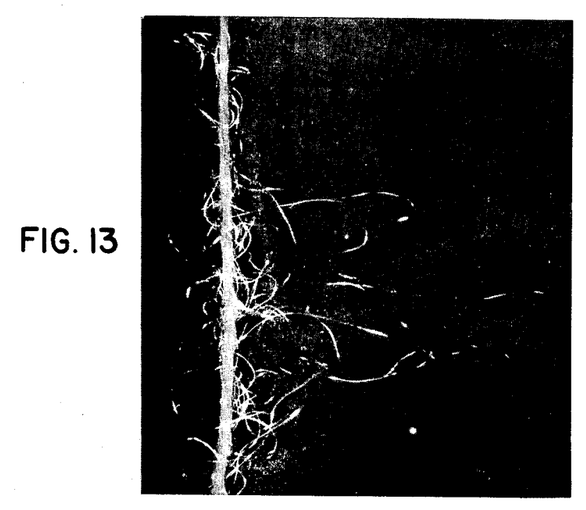

The yarn had an enhanced sparkle due to the trilobal shape of the constituent filaments. A photomicrograph of a length of the yarn is shown in FIG. 13.

Example 5

Figure 14:
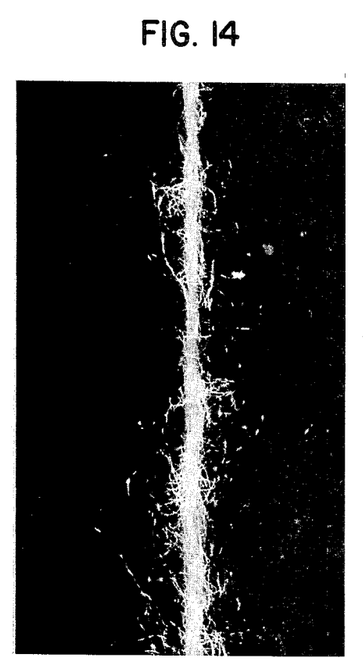

The yarn had the hand or feel of a spun yarn made from polyepsilon caprolactam staple fibres. A photomicrograph of a length of the yarn is shown in FIG. 14.

Examples 6 and 7

In both instances, the yarn had a bulk as expressed by the bulk factor several times in excess of the bulk of a comparable spun staple yarn.

Example 8

The apparatus of Example 1 was employed in the preparations of yarns composed of polyethylene terephthalate filaments. The pertinent dimensions and distances were the same as in that example.

Polyethylene terephthalate having an inherent viscosity of 0.675 (measured in orthochlorophenol at 25° C. and at a concentration of 0.8%) and containing 0.3 percent titanium dioxide as a delustrant was extruded into filaments at a spinning temperature of 280–290° C. Four of the polyethylene terephthalate filaments were passed to the aspirator jet. This jet consumed 18 cubic feet of air per minute and forwarded the filaments to the "wine-glass" loop and twist insertion device, which rotated at a speed of 18,000 feet per minute. The yarn formed from the bundle of loops withdrawn from the "wine-glass" and wound up in the form of a cheese at a rate of 150 feet per minute had the following properties:

Denier: 835
Twist (per inch): 10
Twist factor: 3.98
Tenacity (grams/denier): 0.31
Extension to break (percent): 44.9
Bulk factor (percent): 10.3
Core region (percent of total diameter): 6

Individual filaments had a mean denier of 0.7 and a birefringence of 0.033.

Figure 15:
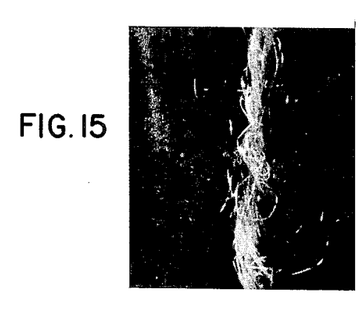

A photomicrograph of a length of the yarn is shown in FIG. 15.

Example 9

The apparatus of Example 1 except for the replacement of the spinneret by a screw extruder was employed in the preparation of yarns composed of polypropylene filaments. The pertinent dimensions and distances are the same as in that example.

Polypropylene having an inherent viscosity of 1.40 (measured in Decalin at 135° C. and at a concentration of 0.5%) and containing 0.3 percent titania as a delustrant was spun through the 0.024 with diameter orifices in a Bone screw extruder at a rate of 0.05 lb./hr./orifice, and at a spinning temperature of 220° C. Four of the polypropylene filaments spun in this way were passed to the aspirator jet.

The aspirator jet consumed 15 cubic feet of air per minute and forwarded filaments to the "wine-glass" which rotated at 18,000 r.p.m., at a speed of about 18,600 feet per minute. The yarn formed from the bundle of loops withdrawn from the "wine-glass" had the following properties:

Denier: 625
Twist (per inch): 10
Twist factor: 2.42
Tenacity (gms./denier): 0.35
Extension to break (percent): 72.0
Bulk factor (percent): 8.1
Core region (percent of total diameter): 10

Figure 16:
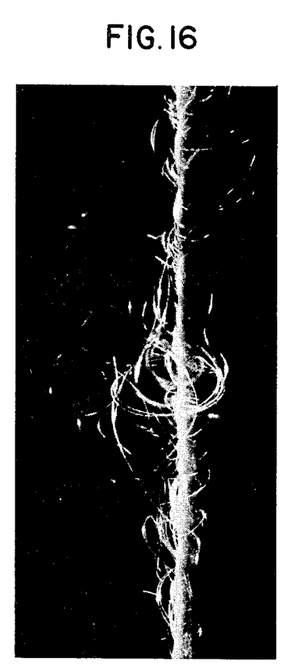

Individual filaments had a mean denier of 0.7 of zero. A photomicrograph of a length of the yarn is shown in FIG. 16. The yarn comprised a compact core, the twist in which can be discerned in the figure, and a peripheral region comprising a multiplicity of predicled loops, many of which were loosely wrapped around the cone. The yarn had the feel of polypropylene staple yarn and a bulk, as evinced by the bulk factors, markedly superior to that of a comparable spun staple yarn.

Many types of filaments are suitable for the yarn of this invention and the process described has been operated successfully for the production of bulky continuous filament yarns from a wide variety of polymeric materials. For example, suitable filaments are prepared from fibre-forming polyamides such as polyhexamethylene adipamide, polyepsilon caprolactam and poly-omega-aminoundeconoic acid, polyesters, such as polyethylene terephthalate, cellulosics, such as cellulose acetate or triacetate, polyacrylics, vinyl polymers, vinylidene polymers, polyurethanes, polyhydrocarbons, and so on. Composite filaments, and filaments derived from blends of polymeric materials may also be used.

Preferred among these polymers are the melt-spinnable ones, which are drawn at spinning and in the same operation by which they are forwarded to the loop and twist insertion device.

While the present apparatus and process are suitable for operation with filaments having a normal cross-section such as those produced where a spinneret having circular shaped orifices is employed for the spinning thereof, filaments having a non-circular cross-section are also suitable, for instance the trilobal shaped polyhexamethylene adipamide filaments of Example 4, and may impart desirable effects to fabrics derived therefrom.

An acceptable yarn with good bull characteristics can be derived from a single filament although many more filaments, generally not more than 50, can also be employed.

From the foregoing, it will be appreciated that the advantages of this invention are manifold. The bulky yarns, and the fabrics into which such yarns are made up, will tend to have those properties, notably handle or feel, covering power and warmth, normally associated with spun staple yarn structures. In addition, the properties inherent in the material forming the continuous filaments will be present, for example, the hard wearing, good strength and no-rotting characteristics associated for example with polyamide yarns and fabrics. The yarns can readily be handled by conventional textile machinery and have been woven and knitted into useful fabrics. The fabrics, on account of the bulk of the yarns from which they are made, have a good warmth and covering power.

The bulky yarn is simply and economically prepared by a process which does not require elaborate equipment and which is integrated with the spinning of the continuous filaments from a source material. The process utilises extremely fine denier continuous filaments to produce a bulky yarn of a greatly enhanced denier and one in which the bulkiness is inherent in its construction and is stable in the subsequent processing of the yarns into fabrics without the necessity of a heat-setting treatment.

We claim:

1. A relatively tension resistant bulky continuous filament yarn which possesses a locked loop structure and which comprises a relatively compact core and a less compact peripheral region, the core being formed of loops aligned in a generally axial direction and arranged so that there is a progressive advancement of loops along said core, twist being present in the aligned loops, and the peripheral region being formed of a multiplicity of loops emerging from the core and extending outwardly therefrom in a random array by a distance equal to at least the diameter of said core.

2. A relatively tension resistant bulky continuous filament yarn which possesses a locked loop structure and which comprises a relatively compact core and a less compact peripheral region, the core being formed of loops aligned in a generally axial direction and arranged so that there is a progressive advancement of loops along said core, twist being present in the aligned loops, and the peripheral region being formed of a multiplicity of loops emerging from the core by a distance equal to at least the diameter of said core, many of which are wrapped around the core for a number of turns.

References Cited

UNITED STATES PATENTS

| | | |
|---|---|---|
| 2,100,588 | 11/1937 | Claus. |
| 2,719,350 | 10/1955 | Slayter et al. |
| 2,773,282 | 12/1956 | Backer. |
| 3,060,674 | 10/1962 | Slayter. |
| 3,118,213 | 1/1964 | Benson. |

JOHN PETRAKES, Primary Examiner

U.S. Cl. X.R.

57—157